United States Patent [19]

Staiger et al.

[11] 4,304,040

[45] Dec. 8, 1981

[54] MACHINING CENTER WITH INTERCHANGEABLE MAGAZINE TOOL STORAGE MEANS

[76] Inventors: Hans Staiger, Oechslinstr. 32, 7320 Göppingen; Eckhard Knorr, Gingener Weg 49/1, 7322 Donzdorf, both of Fed. Rep. of Germany

[21] Appl. No.: 55,878

[22] Filed: Jul. 9, 1979

[51] Int. Cl.³ .................................... B23Q 3/157
[52] U.S. Cl. ................................ 29/568; 211/105
[58] Field of Search ............. 29/26 A, 568; 211/1.5

[56] References Cited

U.S. PATENT DOCUMENTS

| | | | |
|---|---|---|---|
| 3,286,595 | 11/1966 | Wollenhaupt | 29/26 A X |
| 3,355,797 | 12/1967 | Lohneis | 29/568 |
| 3,355,798 | 12/1967 | Drechsler | 29/568 |
| 3,451,125 | 6/1965 | Lehmkuhl | 29/568 |
| 3,524,248 | 8/1970 | Dürr et al. | 29/568 |
| 3,546,774 | 12/1970 | Stoferle et al. | 29/565 |
| 3,650,018 | 3/1972 | Derry et al. | 29/568 |
| 4,173,817 | 11/1979 | Voglrieder et al. | 29/568 |

Primary Examiner—Z. R. Bilinsky
Attorney, Agent, or Firm—John C. Evans

[57] ABSTRACT

A plurality of magazine tool storage means, mounted on a machine frame, above a headstock, includes toolholder supports each having receptors into which tool holders can be inserted. Each support is adjustable so that any of its receptors can be arranged in a predetermined changeover position for performing an automatic tool change between the support and the headstock. The magazine tool storage means are successively movable from a fitting position outside a machine working space in the region of the headstock to a standby position for the automatic tool change within the working space.

2 Claims, 2 Drawing Figures

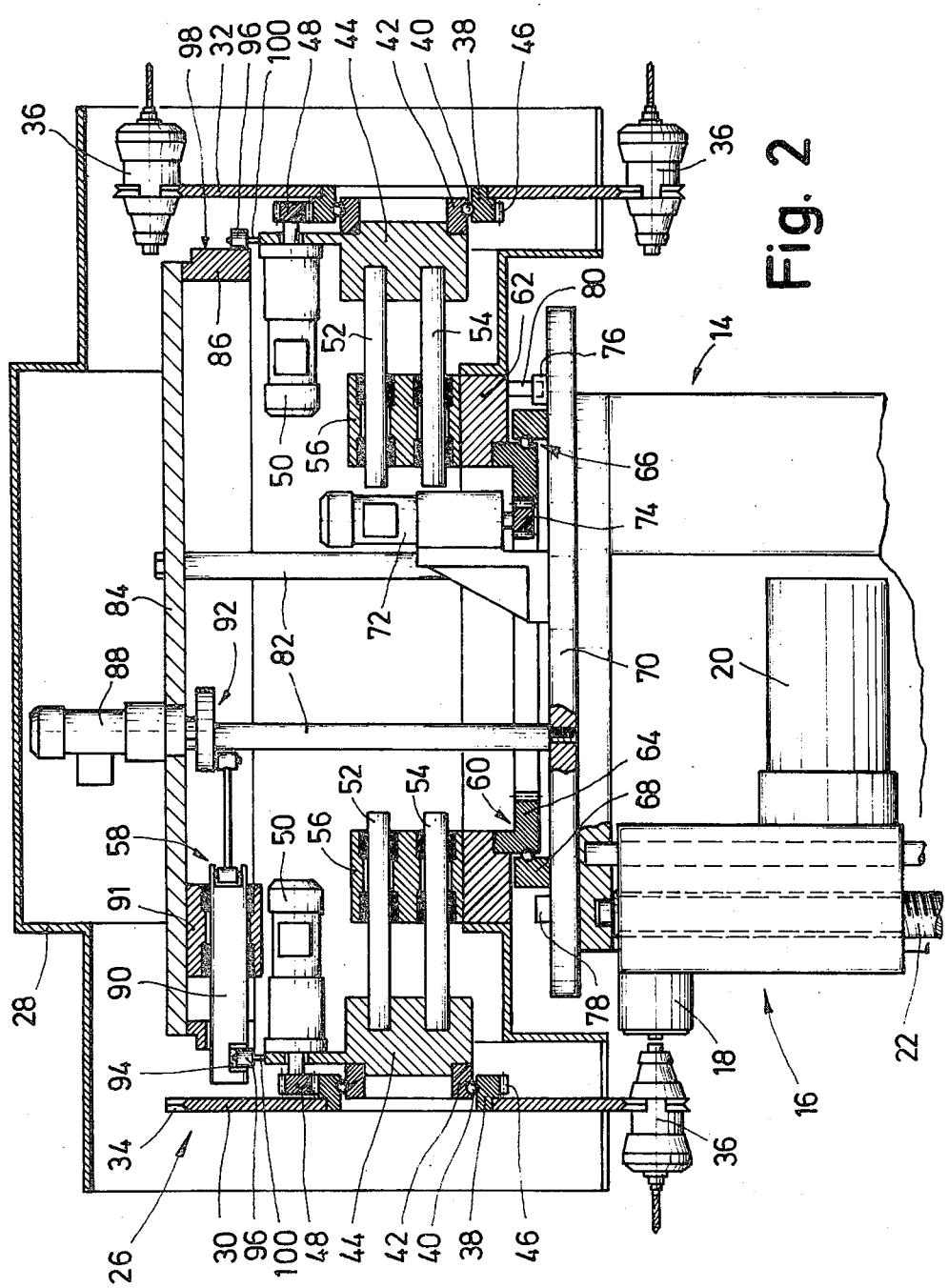

MACHINING CENTER WITH INTERCHANGEABLE MAGAZINE TOOL STORAGE MEANS

The invention relates to a machining center with interchangeable tool storage magazine.

The prior art includes machine tools which are provided at the top of their machine frame with a magazine for storing tools. To this end the magazine is provided with a tool-holder support into which can be inserted a plurality of tool holders, each fitted with a tool. The tool holders stored in the tool-holder support are individually inserted into the work spindle and after use are returned into the tool-holder support.

The tool-holder support or magazine tool storage is equipped, for example, with a total of 24 tool-holder receptors. The number of tools thus made available is frequently insufficient to perform all the operations required in the course of machining a workpiece. In this case it is either necessary for further processing of the workpiece to be performed on another machine tool or tools must be exchanged in the tool-holder support. Another difficulty in such machine tools is that, in the event of damage of processing tools, which occurs frequently, particularly when machining hard materials, it is necessary for the machine to be shut down to enable the necessary change of such tools to be performed.

The present invention provides a machine tool, with a machine frame associated, more particularly at its top, with a magazine for storing tool holders fitted with tools and having at least one tool-holder support with a plurality of tool-holder receptors into each of which a tool holder can be inserted, and to perform an automatic tool change the tool-holder intended for use can be driven into a change-over position by adjustment of the tool-holder support and thereafter can be released from the tool-holder receptor retaining the same and can be transferred to a work spindle, in which the magazine has at least two tool-holders supports which can be successively driven from a fitting position disposed outside the machine working space into a standby position for performing the automatic tool change.

Thus at least two tool storage means are available, so that a substantially large number of storage places are provided and accordingly a workpiece can be machined in one stage.

In cases in which the number of tools to be accommodated in one tool storage means is sufficient for machining a workpiece the machine tool of the invention makes it possible that while one tool storage means is in its standby position tools can be exchanged on the second tool storage means which is in the fitting position, so that the machine tool can be prepared for performing another operating program and no downtimes have to be tolerated, despite the resetting operation.

Furthermore, it is possible to fit both tool storage means with the same set of tools so that when the service life of the tools of one set has elapsed a fresh tool set is immediately available for use.

Furthermore the magazine with two tool storage means offers the important advantage that the one tool storage means is disposed outside the machine working space for the purpose of being fitted, thus facilitating access so that the operator engaged in work on one of the tool storage means is kept away from the region of the work spindle. Furthermore, this also facilitates optimum ergonomic handling of the tool storage means.

Finally, it is possible to store operational programs on different tool storage means which can be prepared and supplied at short notice, more particularly automatically, to the magazine.

The machine frame on which the magazine is disposed may be a supplementary frame provided laterally of a main machine frame or stand. For the purpose of tool changing the latter can in this case be made adjustable relative to the magazine frame perpendicularly to the axis of the work spindle.

If only two tool storage means are provided they can be situated opposite each other in the fitting and standby positions so that the tool storage means which is not in use is situated particularly far outside the machine working space. However, the fitting position can be provided in a region which is situated at a sufficiently long distance from the machine working space even if more than two tool storage means are provided. If the number of tool storage means is even, the fitting position can be still arranged opposite to the tool storage means which is in the standby position.

In a preferred construction, the tool storage means can be driven from the fitting position into the standby position along a common plane, more particularly a horizontal plane.

Another convenient construction ensures that at least the tool storage means which is in the standby position is sufficiently protected by a guard casing against the ingress of machine residues such as swarf into the tool storage means.

For the purpose of resetting the machine tool it is particularly convenient to construct it so that, while one tool storage means is in use, the tool storage means in the fitting position is removable from the machine frame and where appropriate can be exchanged for another tool storage means which has previously been fitted with other tools. It is however, possible for a tool storage means fitted with the same set of tools to be installed so that a complete number of replacement tools is always available in the event that the tools in use become blunt or damaged.

The tool storage means as such can be variously constructed. They can be of block shape or can be formed by support chains, guided over reversing rollers and having provided thereon a plurality of tool-holder receptors. A particularly advantageous construction is a magazine disc with a horizontal axis. In this case the system can be arranged so that a driving device for rotating the magazine disc is provided with a common drive motor for the entire number of magazine discs, but is is preferable for each magazine disc to be rotatable by its own drive motor, The provision of magazine discs as tool storage means permits a particularly advantageous further development of a machine tool whose work spindle is supported in a headstock disposed on the machine frame so as to be vertically adjustable thereon, in which the magazine disc in the standby position is arranged substantially axially parallel with the work spindle.

The tool storage means of the magazine are conveniently disposed on a common turntable which is rotatable about a vertical axis and can be locked in a predetermined rotary position.

The invention will now be described by way of example with reference to the accompanying drawings, in which:

FIG. 2 is a diagrammatic view of a longitudinal section through the magazine and its means of support in conjunction with the headstock of the machining centre, which headstock co-operates with the magazine disc in the standby position for the purpose of performing a tool change.

Figure 1:
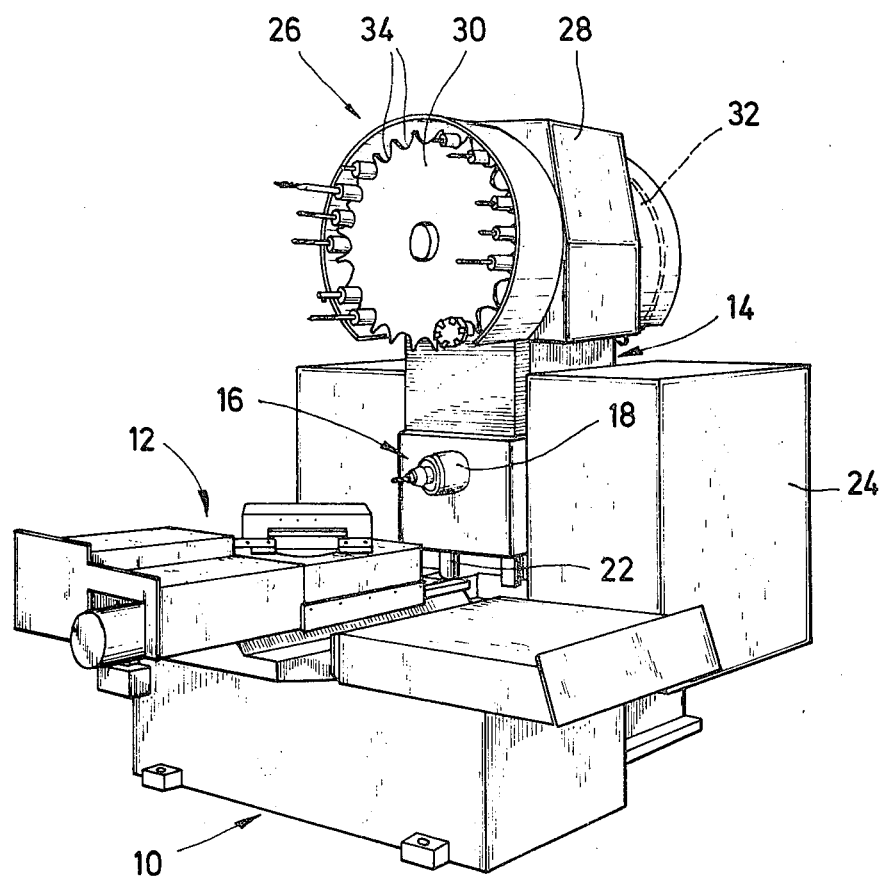
FIG. 1 is a perspective view of a machine tool constructed as a machining centre.

The machining centre illustrated comprises a machine stand 10 supporting a machine table, 12 advantageously formed by a compound slide. A machine frame 14 is disposed behind the machine table 12. A headstock 16 is vertically adjustably guided along vertical guideways on the front of the machine frame 14. The work spindle 18 of the headstock 16 is driven by a d.c. geared motor 20. A rise and fall spindle 22 is provided for adjusting the headstock in the vertical direction along the Y axis. A control cabinet 24 accommodates electrical circuit components and, for example, an electronic control system which is adapted to the operations to be performed on the machining centre and can comprise a process computer for simplifying programming, machine operation and maintainance. A magazine 26 is disposed above the headstock 16, on the machine frame 14, within a removable casing 28.

In the illustrated embodiment the magazine 26 comprises two tool storage discs 30 and 32 arranged coaxially at a distance from each other. The arrangement is such that a selected tool storage magazine disc can be disposed substantially axially parallel with the working spindle 18 in a standby position above the headstock and accordingly the other tool storage magazine disc is disposed on the opposite side of the machine frame 14 outside the working space of the machine centre in a fitting position. Both tool storage magazine discs are identically constructed and are provided on their circumference with a plurality of equi-angularly spaced tool-holder receptors 34 open in the circumferential direction, into each of which can be inserted a toolholder 36 in a position axially parallel with the work spindle 18. By rotation of the tool storage magazine disc which is in the standby position (disc 30 in FIG. 2) the tool-holder receptors 34 can be driven selectively into a changeover position in which the selected tool holder 36 is prepared for takeover by the work spindle 18. In this changeover position the tool holder is situated in the vertical plane of the headstock 16 and adjacent thereto.

To permit setting of the individual tool holder receptors 34 selectively into the changeover position each tool storage magazine disc 30 or 32 is non-rotationally disposed on an outer bearing race 38 of a ball bearing 40 whose inner bearing race 42 is mounted on a bearing member 44 which forms a slide. On the rear of each tool storage magazine disc 30 or 32 there is provided on the circumference of the outer bearing race 38 a gear ring 46 which meshes with a driving pinion 48 of a geared motor 50 mounted on the bearing member 44. By means of the motor 50 which can be controlled by the electronic control system, each tool storage magazine disc can be rotated into the selected changeover position in readiness for exchanging tools when the disc is in the standby position. The tool storage magazine disc disposed in the rear (fitting) position can be rotated through defined angles of rotation either in steps or continuously by means of the geared motor: this will be explained below.

Each bearing member 44 performs the functions of a slide which is adjustably guided in a guide member 56 by a parallel guide comprising guide rods 52, 54. A common setting device 58, whose design and construction will be explained subsequently, is provided for setting the bearing members 44 in the axial direction of the magazine discs 30, 32. The guide members 56 of the bearing members (slides) 44 are disposed on a common turntable 60 comprising a support ring 62 rotatably supported in the horizontal plane on a ball bearing 66 by means of a bearing race 64 with internal teeth which is mounted on the support ring 62. A stationary outer bearing 68, accommodating and supporting the bearing race 64 is mounted on a baseplate 70 disposed horozontally on the machine frame 14.

To drive the tool storage magazine discs 30, 32, successively from the fitting position on the right-hand side of FIG. 2 into the standby position above the headstock 16, the turntable 66 must be rotated, in the present case through 180 degrees which is achieved by means of a geared motor 72 disposed on the baseplate 70, which motor meshes by means of a pinion 74 with the teeth of the bearing race 64. The construction is so arranged that the turntable 60 is rotated through 180 degrees in alternating directions. Its rotational end positions are located by respective stops 76, 78 disposed on the baseplate on which abuts a mating stop 80 for example disposed on the support ring 62 beneath one of the guide members 56. Means for securing the turntable in the stop positions with respect to the baseplate are additionally provided but these are not shown in detail and can be of any convenient construction.

Between the guide members 56 of the bearing members 44 there are on the baseplate 70, upwardly extending support columns 82 (for example, three) which are disposed at an identical angular spacing with respect to each other and of which only two are shown in FIG. 2. A horizontal support plate 84 which covers the previously described components of the magazine is supported by the columns 82. The support plate 84 carries on its underside a ring 86 disposed coaxially with respect to the axis of rotation of the turntable 60; the purpose of the ring 86 will be described below.

The support plate 84 supports a geared motor 88 of the setting device 58, whose purpose it is to move the tool storage magazine disc which is in the standby position in opposite axial directions to perform a tool change when this has become due. To this end the setting device 58 is provided with a rod-shaped driver 90 arranged to slide parallel with the bearing member 44 associated with the magazine disc which is in the standby position. Advantageously the driver 90 is guided in a stationary bearing member 91 and can be axially adjusted by means of a crank drive 92 associated with the geared motor 88. The setting device 58 could, however, be disposed in the region between the bearing members 56 of the magazine discs and its crank drive 92 could be coupled to the bearing member 44 of the disc which at that time is in the standby position.

At its end projecting from the ring 86 the driver 90 is provided on its underside with an engagement groove 94 extending transversely to its longitudinal orientation. Each bearing member 44 is provided with a coupling element 96 which positively engages with the groove 94 when the bearing member 44 is in the standby position, so that as a consequence the associated magazine disc can be axially adjusted by means of the geared motor 88. Advantageously, the coupling elements 96 are formed by rollers which roll on the guide cam 98 and each is rotatably supported on a suitable bearing bolt 100.

Positive coupling of the bearing members 44 which move successively into the standby position assumes that the coupling elements are in a predetermined radial position with respect to the rotational axis of the turntable. This is achieved by means of the cylindrical ring 86, which is arranged on the support plate 84, namely by its external circumferential surface forming a guide surface 98 on which the coupling elements 96 of the bearing members 44 bear constantly This calls for a radially oriented contact force acting on the bearing members 44, which force can be produced by suitable power accumulators, (not shown). In its standby position the driver 90 will be so situated within the ring 86 that the inner wall of its engagement groove 94 is disposed on the external circumference of the ring 86.

In the illustrated embodiment of a machine centre the tool storage magazine disc 32 in the fitting position is disposed at the rear of the machining centre and will therefore be situated completely outside the machine working space so that tools can be exchanged on the said tool storage magazine disc or it can be refitted for a different working program while tools of the tool storage magazine disc 30 are in use on the machining centre.

The construction can also be so arranged that the tool storage magazine discs can be removed from the bearing members 44 so that, for example, magazine discs fitted with tools for performing different operating programs are held in preparation and can be supplied to the magazine in the fitting position at short notice, preferably automatically.

No detailed explanation is given as regards the relative motions between the tool storage magazine disc in the standby position and the headstock, required for performing the tool change, since the manner of tool changing practice in conjunction with the present machining centre is known.

We claim:

1. A machine tool, comprising:
   a. a machine frame having a central vertical axis;
   b. a headstock, said headstock having a work spindle mounted in a horizontal axis;
   c. means for moving said headstock vertically on said machine frame;
   d. a turntable mounted on said machine frame adapted to be rotatable about said vertical axis and locked in a predetermined position;
   e. a magazine for storing toolholders, said magazine adapted to rotate about said vertical axis on said turntable, said magazine including:
      1. two circular magazine discs having horizontal axes mounted on said turntable, said magazine discs being provided a plurality of tool storage means mounted on the circumference of said magazine discs;
      2. the first one of said tool storage magazine discs being in a standby position adjacent said spindle means for performing an automatic tool change;
      3. a first motor means for rotating said first one of said tool storage magazine discs;
      4. a second ond of said tool storage magazine discs being in a fitting position outside the machine working space;
      5. a second motor means for rotating said second magazine disc in said fitting position;
   f. means for moving said magazine disc in an axial direction, said moving means including:
      1. guide means parallel to the horizontal axis of said magazine disc; and
      2. a geared motor means for moving said magazine disc in said standby position horizontally in said guide means.

2. A machine tool as defined in claim 19 further comprising; means for moving said magazine disc into a defined axial position, said means comprises a guide surface and guide rollers arranged to cooperate with said guide surfaces.

* * * * *